United States Patent
Tanaka et al.

(10) Patent No.: US 6,224,028 B1
(45) Date of Patent: May 1, 2001

(54) CANTILEVER SHAFT ASSEMBLY FOR ROTATING MEMBER

(75) Inventors: Koji Tanaka; Katsuo Doi, both of Osaka-fu (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/339,615

(22) Filed: Jun. 24, 1999

(30) Foreign Application Priority Data

Jun. 29, 1998 (JP) .................................................. 10-182234

(51) Int. Cl.$^7$ ...................................................... F16M 11/00
(52) U.S. Cl. ............................................. 248/200; 474/165
(58) Field of Search ................................. 248/200, 205.1, 248/224.8, 694, 544, 674, 534, 538, 65, 53; 474/165

(56) References Cited

U.S. PATENT DOCUMENTS 3,944,055   3/1976   Stumpf .

4,950,398 * 8/1990 Wiegand et al. ..................... 210/232

* cited by examiner

*Primary Examiner*—Ramon O. Ramirez
(74) *Attorney, Agent, or Firm*—Dann, Dorfman, Herrell and Skillman; Henry H. Skillman

(57) ABSTRACT

A cantilever shaft assembly includes a steel pipe firmly secured at one end to a wall surface of a stationary support member, and a core shaft made from a synthetic resin and having a body portion removably fitted in the steel pipe and an end portion located outside the steel pipe. The end portion forms a free end of the cantilever shaft assembly and rotatably supports thereon a rotating member such as a driven sprocket. The core shaft and the steel pipe are locked and held together by a locking device such as a pin or a key. The cantilever shaft assembly is light in weight and can be easily repaired at a low cost when the end portion of tne synthetic resin core shaft is damaged or worn out.

16 Claims, 3 Drawing Sheets

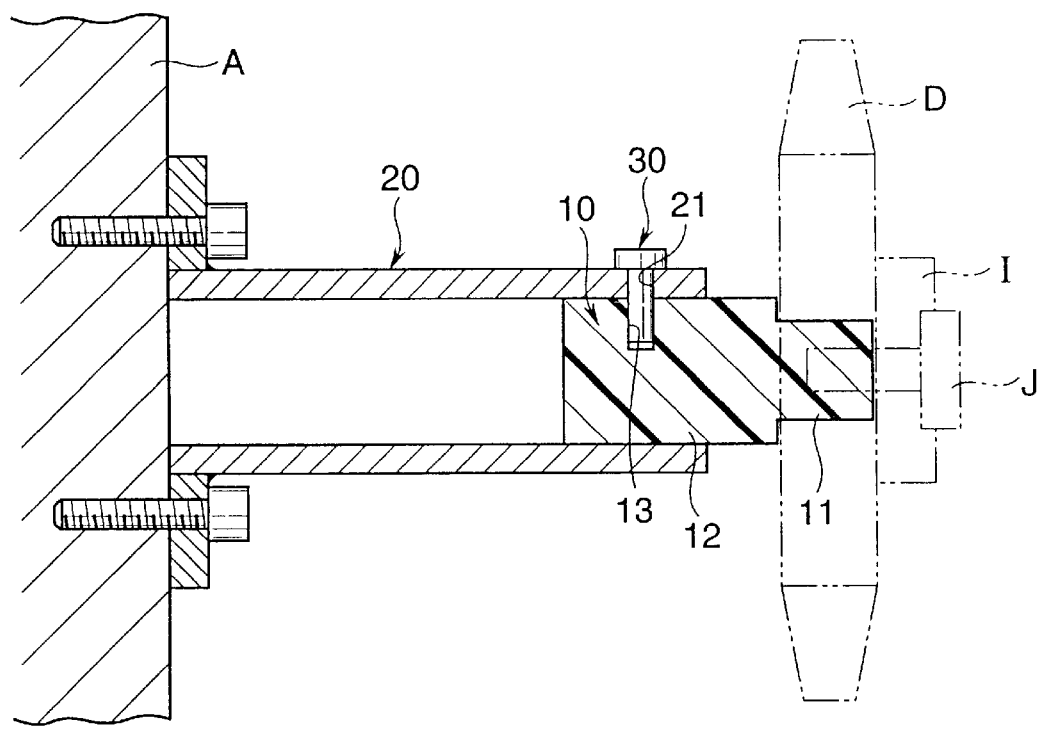
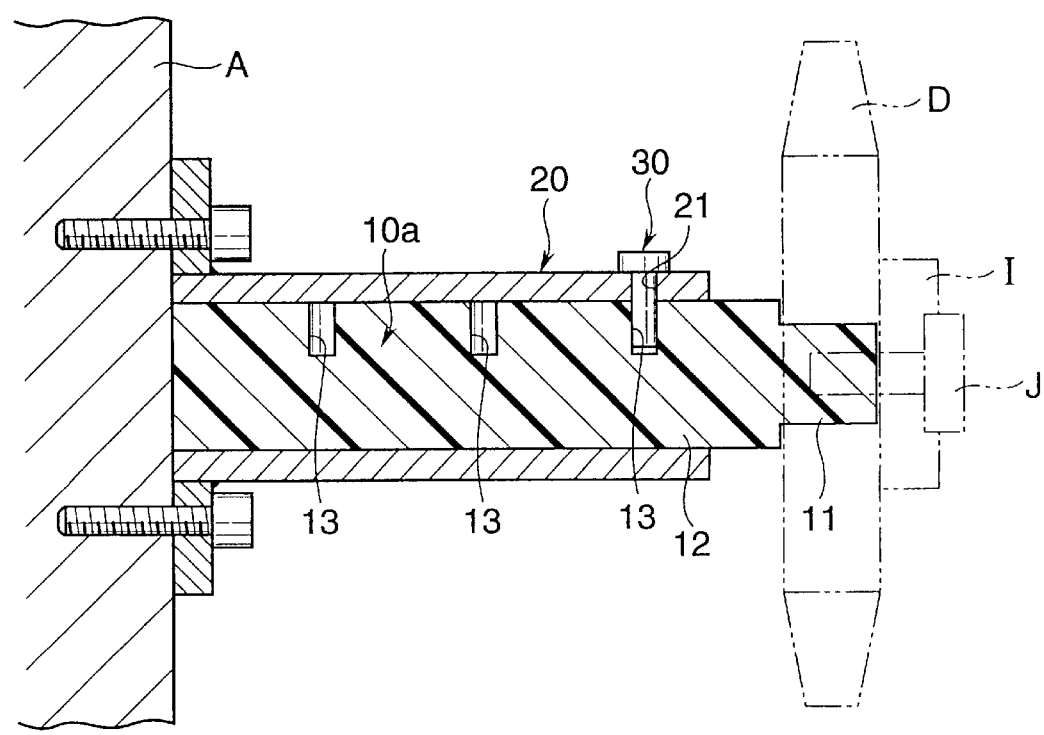

CANTILEVER SHAFT ASSEMBLY FOR ROTATING MEMBER

BACKGROUND OF THE INVENTION

1. Field of the Invention

The present invention relates generally to a cantilever shaft assembly having a shaft body made from a synthetic resin and rotatably supporting a rotating member such as a power transmission sprocket or a power transmission pulley. More particularly, this invention relates to such a cantilever shaft assembly which is particularly suitable for use in a water-treatment sludge scraping apparatus or a plating dross collecting and removing apparatus.

2. Description of the Related Art

Conventional cantilever shafts, as shown in FIG. 6, include a free end portion X rotatably supporting thereon a rotating member such as a driven sprocket S, and a flanged body portion X2 adapted to be attached to the surface of a stationary supporting member. To reduce the weight and improve the corrosion resistance, the cantilever shaft X is molded from a synthetic resin material into a one-piece structure. The synthetic resin molded cantilever shaft X is used in a sludge scraping machine disclosed in Japanese Utility Model Laid-open Publication No. (HEI) 2-57109 and Japanese Patent Laid-open Publication No, (HEI) 3-96711.

To secure reliable and firm attachment to the supporting member such as a wall, the synthetic resin molded cantilever shaft has a specific cone-like configuration consisting of the free end portion X1 of reduced diameter and the flanged body portion X2 of enlarged diameter.

The conventional cantilever shaft has varius drawbacks as enumerated below.

(1) Due to its specific cone-like configuration, the conventional cantilever shaft requires a special molding die which is expensive to manufacture. Because of a little demand, the cantilever shaft is not suited for mass-production. Thus, the manufacturing cost of the conventional cantilever shaft is relatively high.

(2) The synthetic resin cantilever shafts molded on the same molding die have a fixed length. Accordingly, when used in an application where different lengths of cantilever shafts are necessary to form various types of water treatment sludge scraping apparatuses, a corresponding number of molding dies must be provided. The thus formed synthetic resin cantilever shafts are highly expensive to manufacture.

(3) When the free end portion rotatably supporting the rotating member is damaged or worn out, the conventional cantilever shaft, due to its one-piece structure, must be replaced for repairing as a whole including the undamaged body portion. Replacement of the overall structure is inefficient, laborious and time-consuming.

(4) To replace the partially damaged synthetic resin cantilever shaft with a new cantilevered shaft is wasteful of resources and requires an adequate waste disposal treatment to avoid environmental contamination.

SUMMARY OF THE INVENTION

It is accordingly an object of the present invention to provide a cantilever shaft assembly for rotating members which is light in weight, has an excellent corrosion resistance, can be manufactured at a relatively low cost, is easy to repair or replace, and is particularly suitable for use in a water treatment sludge scraping apparatus.

To achieve the foregoing object, a cantilever shaft assembly according to the present invention includes a steel pipe firmly secured at one end to a wall surface of a stationary support member and projecting perpendicularly from the wall surface, and a core shaft made from a synthetic resin and having a body portion removably fitted in the steel pipe and an end portion located outside the steel pipe. The end portion of the core shaft forms a free end of the cantilever shaft assembly and rotatably supports thereon a rotating member. The core shaft and the steel pipe are locked and held together by a locking device.

The cantilever shaft assembly thus constructed is light in weight and can be easily repaired at a low cost when the end portion of the synthetic resin core shaft-is damaged or worn out.

The locking device may be a locking pin fitted through a radial through-hole in the steel pipe into a radial hole formed in the body portion of the core shaft. The locking pin may be replaced by a locking key in which instance the body portion of the core shaft has a key seat. The key is fitted in the key seat through the radial through-hole of the steel pipe.

Preferably, the body portion of the core shaft has a plurality of radial holes formed at equal intervals along an axis of the core shaft. The locking pin is fitted in one of the radial holes. The intervals between said radial holes are preferably substantially equal to a length of the end portion of the core shaft. When the end portion of the synthetic resin core shaft is damaged or worn out, the core shaft is removed from the steel pipe. The damaged end portion is cut off or removed, then an end part of the body portion is cut or machined to form a new end portion of reduced diameter. The body portion is inserted again into the steel pipe, and the locking pin is fitted in an adjacent radial hole of the core shaft which is displaced by one pitch from the one radial hole toward the fixed end of the steel pipe.

The plural radial holes of the core shaft may be replaced with plural key seats formed in the body portion at equal intervals along the axis of the core shaft.

The core shaft may further have an additional end portion having the same size as the first-mentioned end portion and projecting from an end of said body portion in a direction opposite to the first-mentioned end portion. The additional end portion is normally received inside the steel pipe. When the first-mentioned end portion of the core shaft is damaged or worn out, the core shaft is removed from the steel pipe, then inserted again in the steel pipe so that the additional end portion forms a free end of the cantilever shaft assembly. The damaged end portion is received inside the steel pipe. Thus, the damaged core shaft can be easily repaired without a substantive downtime of a chain transmission mechanism in which the rotating member is incorporated.

The above and other objects, features and advantages of the present invention will become apparent to those versed in the art upon making reference to the following detailed description and the accompanying sheets of drawings in which certain preferred structural embodiments incorporating the principle of the present invention are shown by way of illustrative examples.

BRIEF DESCRIPTION OF THE DRAWINGS

FIG. 1 is a longitudinal cross-sectional view of a cantilever shaft assembly according to a first embodiment of the present invention for rotatably supporting a rotating member;

FIG. 2 is a view similar to FIG. 1, but showing a cantilever shaft assembly according to a second embodiment of the present invention including a shaft with multiple locking holes;

DETAILED DESCRIPTION OF THE PREFERRED EMBODIMENTS

Figure 5:
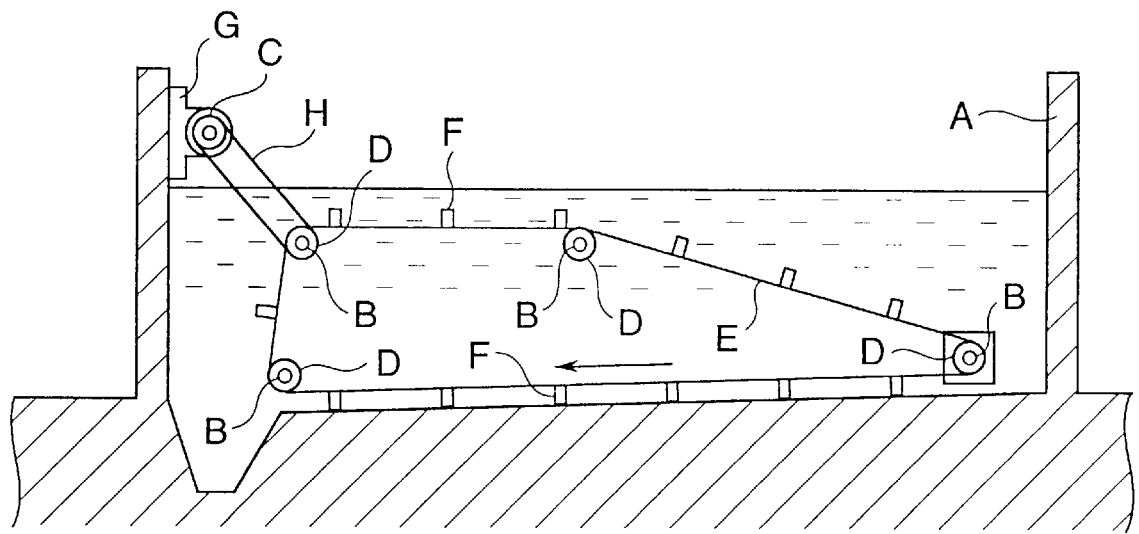
FIG. 5 is a diagrammatical view showing the general construction of a water treatment sludge scraping apparatus in which the cantilever shaft assembly of the present invention is incorporated.

Referring now to the drawings, wherein like reference characters designate like or corresponding parts throughout the several views, FIG. 5 diagrammatically shows a sludge scraping apparatus incorporated in a water treatment plant having a water treatment pool or pit A. The sludge scraping apparatus includes two groups of cantilever shafts B (only one group being shown) projecting in confronting relation from two opposed sidewalls of the water treatment pit A. Each of the cantilever shafts B rotatably supports thereon one driven sprocket D. A pair of parallel spaced endless chains E (one being shown) is trained around the respective sets of driven sprockets D rotatably mounted on the two groups of cantilever shafts B. A number of scraping plates F extend crosswise between the endless chains E and are firmly attached to the endless chains E. The endless chains E are driven by a drive unit G via a drive chain H stretched between a drive sprocket C of the drive unit G and one of the driven sprockets D. The drive unit G is mounted to a wall surface above the level of waste water retained in the water treatment pit A, while the cantilever shafts B are normally immersed in the waste water. Though not shown, guide rails are disposed on the bottom of the water treatment pit A for facilitating smooth sliding movement of the scraping plates F.

The present invention is particularly useful when embodied in the cantilever shafts B on which the driven sprockets D are rotatably mounted.

According to a first embodiment of the present invention shown in FIG. 1, the cantilever shaft comprises a cantilever shaft assembly which includes a core shaft 10 made from a synthetic resin and detachably connected to a steel pipe 20 by means of a locking device 30. The synthetic resin core shaft 10 has an end portion 11 forming a free end of the cantilever shaft assembly on which a driven sprocket D (rotating member) is rotatably mounted, and a body portion 12 integral with the end portion and slidably fitted in the steel pipe 20. The body portion 12 has a radial blind hole 13. The end portion 11 has a smaller diameter than the body portion 12 and is formed by cutting or machining an end portion of a round synthetic resin shaft blank into a small-diameter end portion. The core shaft 10 is preferably made from a wear resistant synthetic resin, such as tetrafluoroethylene, nylon, ultra-high-molecular-weight polyethylene, polyacetal, phenol resin, or polybutylene-terephtalate. Especially for use in the water treatment sludge scraping apparatus, such as shown in FIG. 5, a synthetic resin material having a high corrosion resistance is particularly suitable.

The steel pipe 20 has one end fixed to a stationary supporting wall surface of, for example, the water treatment pit A by means of a suitable fastener, such as bolts, so that the pipe 20 projects perpendicularly from the supporting wall surface. The steel pipe 20 may be attached by welding to the supporting wall surface. The steel pipe 20 has a radial through-hole 21 located near the distal or free end of the steel pipe 20. The through-hole 21 has substantially the same diameter as the blind hole 13 of the core shaft 10. The steel pipe 20 is preferably made of corrosion resistant metal such as stainless steel.

The locking device 30 is comprised of a removable locking pin inserted through the radial through-hole 21 of the steel pipe 20 into the radial blind hole 13 in the body portion 12 or the core shaft 10. The locking pin 30 thus arranged locks and holds together the core shaft 10 and the steel pipe 20 against relative movement. The locking pin 30 has an enlarged circular head.

The phantom-lined driven sprocket D is rotatably mounted on the end portion 11 of the synthetic resin core shaft 10 by means of an end plate I attached by a fastener, such as a screw J, to an end face of the end portion 11 of the core shaft 10.

Figure 6:
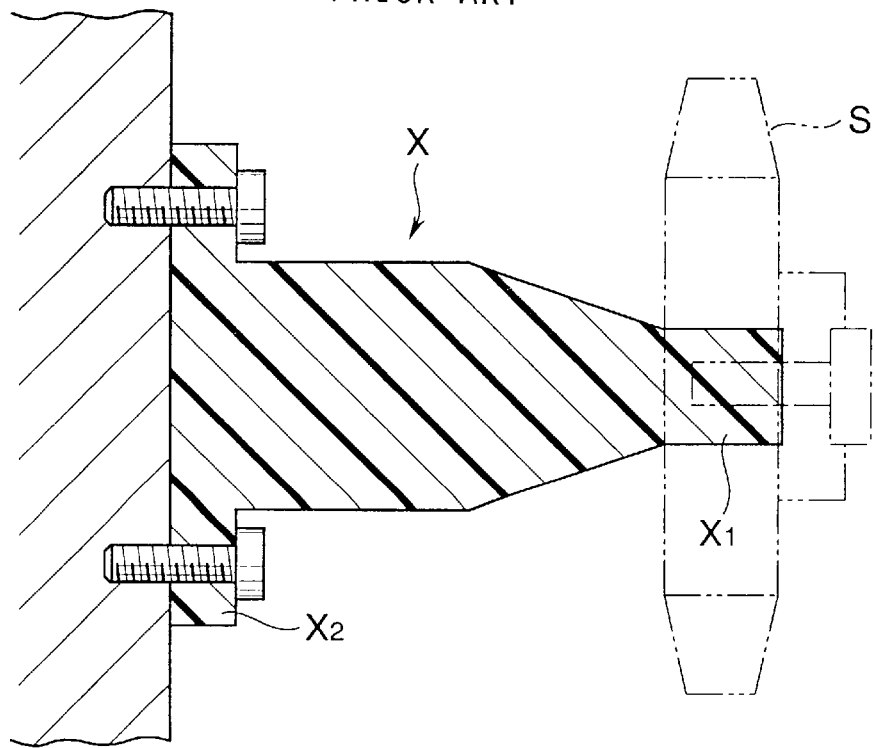
FIG. 6 is a longitudinal cross-sectional view of a conventional cantilever shaft for rotatably supporting a rotating member.

Due to a two-piece structure composed of the synthetic resin core shaft 10 directly supporting the driven sprocket D and the steel pipe 20 attached to the wall surface of the water treatment pit A, the cantilever shaft assembly is considerably lighter in weight than the conventional solid synthetic resin cantilever shaft X shown in FIG. 6. Additionally, the distance between the driven sprocket D and the wall surface can be adjusted by changing the length of the steep pipe 20 or the length of the core shaft 10. Since the core shaft 10 including the end portion 11 of reduced diameter can be readily produced from a round synthetic resin bar or rod without requiring a specific molding die, the cantilever shaft assembly as a whole can be manufactured at a relatively low cost Additionally, because the synthetic resin core shaft 10 and the steel pipe 20 are detachably connected by the locking device 30, when the end portion 11 of the core shaft 10 is damaged or worn out, the core shaft 10 is removed from the steel pipe 20 for repairing. The cantilever shaft assembly, as against the conventional cantilever shaft X (FIG. 6), can avoid replacement of the overall structure for repairing which is laborious and time-consuming and involves a long downtime of a chain transmission mechanism including the driven sprocket D.

FIG. 2 shows a cantilever shaft assembly according to a second embodiment of the present invention. This assembly is structurally the same as the assembly of the foregoing embodiment shown in FIG. 1, excepting that the core shaft 10a has a plurality (three in the illustrated embodiment) of radial blind holes 13 formed in a body portion 12 at equal intervals along the axis of the core shaft 10. The core shaft 10a and a steel pipe 20 are joined together by a locking pin 30 fitted in one of the radial blind holes 13 through a radial through-hole 21 formed in the steel pipe 20. The spacing or pitch between the adjacent radial blind holes 13 is set to be substantially equal to the length of a small-diameter end portion 11 of the core shaft 10a on which the driven sprocket D is rotatably mounted.

With this arrangement, when the end portion 11 of the synthetic resin core shaft 10a is damaged or worn out, the locking pin 30 is removed, allowing the core shaft 10 to be detached from the steel pipe 20. The damaged end portion 11 is cut off or removed, and an end part of the body portion 12 of the ore shaft 10a is cut or machined to produce a new end portion of the same size as the original end portion 11 now removed. The body portion 12 of the core shaft 10a is inserted again into the steel pipe 20, and the locking pin 30 is fitted in an adjacent radial blind hole 13. The foregoing repairing operation may be repeated to reproduce the end portion 11. Thus, the material of the core shaft 10a can be used effectively. A waste synthetic resin material produced during repairing is very small and can be properly treated or disposed without fear of environmental contamination. Additionally, because the plural equidistant radial blind holes 13 formed in the core shaft 10a for fitting engagement with the locking pin 30 enables stepwise adjustment of the distance between the wall surface of the water treatment pit A and the driven sprocket D, it is possible to locate the driven sprocket D at a desired position relative to the wall surface of the water treatment pit A.

Figure 3:
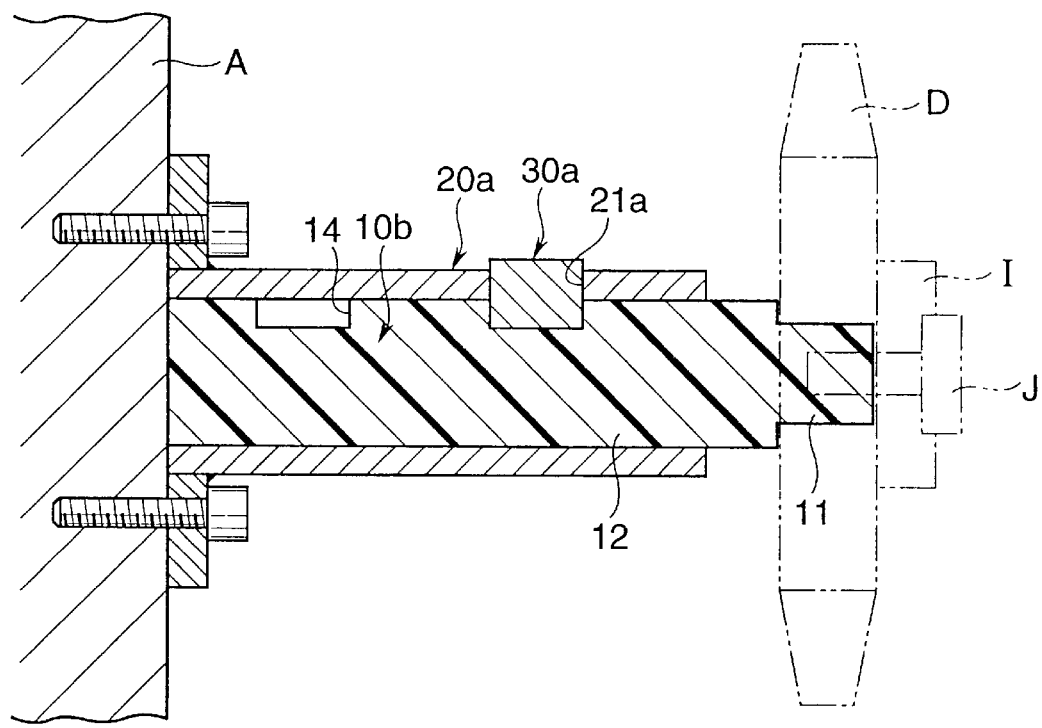
FIG. 3 is a view similar to FIG. 1, but showing a cantilever shaft assembly according to a third embodiment of the present invention including a locking means consisting of a key.

FIG. 3 shows a cantilever shaft assembly according to a third embodiment of the present invention. This assembly is substantially the same in construction as the assembly shown in FIG. 2 with the exception that the locking device is a locking key 30a, and the locking key 30a is inserted through a radial through-hole or opening 21a of a steel pipe 20a into one of plural key seats 14 formed in a body portion 12 of a core shaft 10b along the axis of the core shaft 10b. The radial through-hole 21a is complemental in shape to the locking key 30a. The locking key 30a forms a joint between the core shaft 10b and the steel pipe 20a which is superior in strength and reliability of bonding than the pin joint shown in FIGS. 1 and 2. By virtue of the key seats 14 spaced in the axial direction of the core shaft 10b, the distance between the wall surface of a water treatment pit A and the driven sprocket D can be adjusted. This means that the position of driven sprocket D relative to the wall surface of the water treatment pit A can be adjusted stepwise. When an end portion 11 of the core shaft 10b is damaged or worn out, the damaged end portion 11 is removed by cutting, and an end part of the body portion 12 is cut or machined to produce a new end portion of the same size as the original end portion 11 now removed.

Figure 4:
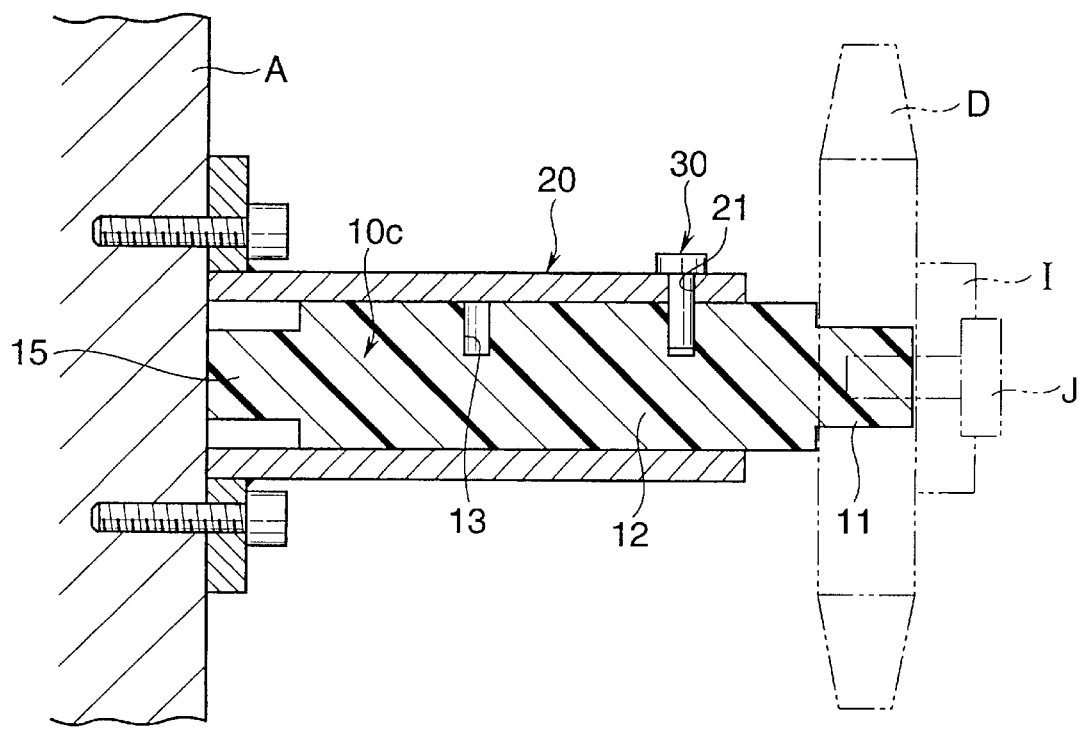
FIG. 4 is a view similar to FIG. 1 but showing a cantilever shaft assembly according to a fourth embodiment of the present invention having two supporting end portions at opposite ends of shaft.

FIG. 4 shows a cantilever shaft assembly according to a fourth embodiment of the present invention. This assembly is substantially the same as the assembly shown in FIG. 2, excepting that a synthetic resin core shaft 10c has an additional end portion 15 projecting from a rear end (inner end) of body portion 12 in the opposite direction to the end portion 11. The additional end portion 15 has the same size as the end portion 11 and hence is able to rotatably supporting the driven sprocket D. The additional end portion 15 is normally received inside the steel pipe 20.

When the end portion 11 is damaged or worn out, the core shaft 10c is removed from the steel pipe 20, then inserted again into the steel pipe 20 with the damaged end portion 11 as a leading end facing the wall surface of the water treatment pit A. The additional end portion 15 is now located at the distal end of the cantilever shaft assembly and functions as a new support portion for the driven sprocket D. Since the damaged end portion 11 is immediately replaced by the additional end portion 15, a chain transmission mechanism incorporating the driven sprocket D can continue operation without a downtime. Furthermore, the additional end portion 15 enables repairing of the damaged end portion 11 without requiring a cutting or machining work effected on the body portion 12 to produce an new end portion.

The cantilever shaft assemblies of the present invention are particularly suitable for use in a water treatment sludge scraping apparatus, a plating dross collecting and removing apparatus and so on and they have various advantages, as enumerated below.

(1) Because of a two-piece structure composed of a steel pipe fixed at one end to the wall of a supporting member, and a synthetic resin core shaft removably fitted in the steel pipe and having an end portion on which a rotating member is rotatably mounted, the cantilever shaft assembly of the present invention is less heavy than the conventional one-piece molded cantilever shaft, The distance between the rotating member and the wall of the supporting member can be adjusted by changing the length of the steel pipe or an extent of the core shaft projecting from the steel pipe. This obviates the need for various molding dies of different sizes as in the manufacture of the conventional cantilever shafts. Thus, the cantilever shaft assembly of the invention can be manufactured at a lower cost than the conventional cantilever shaft. The two-piece structure further enables easy and short-time repairing of a damaged cantilever shaft assembly because when the free end portion of the core shaft is damaged or worn out, only the core shaft is removed for repairing.

(2) By virtue of a plurality of radial holes or key seats formed in a body portion core shaft at equal intervals along the axis of the core shaft, the core shaft can still be used even when the end portion is damaged or worn out. The damaged end portion is cut off or removed, and an end part of the body portion is cut or machined to produce a new end portion of the same size as the original end portion. A locking device such as a pin or a key is fitted in a radial hole or a key seat which is located next to the radial hole or the key seat previously engaged with the pin or the key. Thus, the material of the core shaft can be used effectively. Additionally, because only a small amount of waste synthetic resin material is produced during repairing, the waste material can be properly treated or disposed without fear of environmental contamination. The plural radial holes or key seats provided for fitting engagement with the pin or key further enables stepwise adjustment of the distance between the rotating member and the wall of the supporting member. The rotating member can, therefore, be located at a desired position relative to the wall of the supporting member. The key forms a joint between the core shaft and the steel pipe which is superior in bonding strength and stability to a joint formed by the pin between the core shaft and the steel pipe.

(3) An additional end portion projecting from an end face of the body portion in a direction away from the end portion is normally located inside the steel pipe. When the end portion of the core shaft is damaged or worn out, the additional end portion takes the place of the damaged end portion and is used as a free end of cantilever shaft assembly on which the rotating member is rotatably mounted. The additional end portion obviates the need for a cutting or machining work effected on the body portion to produce a new end portion.

Obviously, various minor changes and modifications of the present invention are possible in the light of the above teaching. It is therefore to be understood that within the scope of the appended claims the present invention may be practiced otherwise than as specifically described.

What is claimed is:

1. A cantilever shaft assembly for rotatably supporting a rotating member at a free end thereof, comprising:
   a steel pipe adapted to be firmly secured at one end to a wall surface of a stationary support member and projecting perpendicularly from the wall surface;
   a core shaft made from a synthetic resin and having a body portion removably fitted in said steel pipe and an end portion located outside said steel pipe, said end portion forming the free end of said cantilever shaft assembly and adapted to rotatably support thereon the rotating member;

a locking device operable in one position to lock and hold together said core shaft and said steel pipe and operable in a second position to afford separation of said core shaft from said steel pipe.

2. A cantilever shaft assembly according to claim 1, wherein said steel pipe has at least one radial through-hole, said core shaft has at least one radial hole formed in said body portion, and said locking device is a locking pin inserted through said radial through-hole of the steel pipe into said radial hole of the core shaft.

3. A cantilever shaft assembly according to claim 2, wherein the number of said radial hole in the body portion is plural, said plural radial holes are formed at intervals along an axis of said core shaft, and said locking pin is fitted in one of said plural radial holes.

4. A cantilever shaft assembly according to claim 3 wherein said core shaft end portion has a given length, and said radial holes are spaced at equal intervals, and said intervals between said radial holes are substantially equal to said given length.

5. A cantilever shaft assembly according to claim 4 wherein said synthetic resin forming the core shaft is a material which may be machined and shaped, such that, when removed from the steel pipe, said given length of the core shaft end portion may be severed and a length of the body portion equal to said given length may be shaped to conform to said severed length.

6. A cantilever shaft assembly according to claim 1, wherein said steel pipe has at least one radial through-hole, said core shaft has at least one key seat formed in said body portion, and said locking device is a locking key fitted in said key seat of the core shaft through said radial through-hole of the steel pipe.

7. A cantilever shaft assembly according to claim 6, wherein the number of said key seat in the body portion is plural, said plural key seats are formed at intervals along an axis of said core shaft, and said locking key is fitted in one of said plural key seats.

8. A cantilever shaft assembly according to claim 7, wherein said core shaft end portion has a given length and said key seats are spaced at equal intervals, and said intervals between said key seats are substantially equal to said given length.

9. A cantilever shaft assembly according to claim 8 wherein said synthetic resin forming the core shaft is a material which may be machined and shaped, such that, when removed from the steel pipe, said given length of the core shaft end portion may be severed and a length of the body portion equal to said given length may be shaped to conform to said severed length.

10. A cantilever shaft assembly according to claim 1, wherein said core shaft further has an additional end portion having the same size as the first-mentioned end portion and projecting from an end of said body portion in a direction opposite to the first-mentioned end portion, said additional end portion being normally received inside said steel pipe.

11. A cantilever shaft assembly according to claim 10, wherein said steel pipe has at least one radial through-hole, said core shaft has at least one radial hole formed in said body portion, and said locking device is a locking pin inserted through said radial through-hole of the steel pipe into said radial hole of the core shaft.

12. A cantilever shaft assembly according to claims 11, wherein the number of said radial hole in the body portion is plural, said plural radial holes are formed at intervals along an axis of said core shaft, and said locking pin is fitted in one of said plural radial holes.

13. A cantilever shaft assembly according to claim 12, wherein each of said end portions has a given length and said radial holes are spaced at equal intervals, and said intervals between said radial holes are substantially equal to said given length.

14. A cantilever shaft assembly according to claim 10, wherein said steel pipe has at least one radial through-hole, said core shaft has at least one key seat formed in said body portion, and said locking device is a locking key fitted in said key seat of the core shaft through said radial through-hole of the steel pipe.

15. A cantilever shaft assembly according to claim 14, wherein the number of said key seat in the body portion is plural, said plural key seats are formed at intervals along an axis of said core shaft, and said locking key is fitted in one of said plural key seats.

16. A cantilever shaft assembly according to claim 15, wherein said key seats are spaced at equal intervals, and said intervals between said key seats are substantially equal to a length of said first-mentioned end portion and said additional end portion of said core shaft.

* * * * *